(12) United States Patent
Doleschel et al.

(10) Patent No.: US 8,209,137 B2
(45) Date of Patent: Jun. 26, 2012

(54) PROCESS FOR CONTACT-FREE DETERMINATION OF FORCES AND/OR TORQUE ACTING ON A HOLLOW-CYLINDRICAL BODY AS WELL AS A MEASUREMENT ARRANGEMENT FOR IMPLEMENTING THE PROCESS

(75) Inventors: Andreas Doleschel, Aying/Grosshelfendorf (DE); Wolfang Wagner, Inning am Holz (DE); Georg Wurzel, Ottobrunn (DE)

(73) Assignee: Eurocopter Deutschland GmbH (DE)

( * ) Notice: Subject to any disclaimer, the term of this patent is extended or adjusted under 35 U.S.C. 154(b) by 411 days.

(21) Appl. No.: 12/609,312

(22) Filed: Oct. 30, 2009

(65) Prior Publication Data

US 2010/0114504 A1    May 6, 2010

(30) Foreign Application Priority Data

Oct. 30, 2008   (DE) .......................... 10 2008 054 028

(51) Int. Cl.
*G01B 11/16* (2006.01)
*G06F 19/00* (2011.01)

(52) U.S. Cl. ................ 702/41; 73/862.621; 73/862.642; 250/227.18; 356/364

(58) Field of Classification Search .................... 702/33, 702/41, 85, 105, 113, 159, 189; 73/862.621, 73/862.642; 250/227.18; 356/364, 497, 356/512
See application file for complete search history.

(56) References Cited

U.S. PATENT DOCUMENTS

| | | | |
|---|---|---|---|
| 3,643,502 A * | 2/1972 | Birkholtz | ................ 73/862.642 |
| 4,863,274 A | 9/1989 | Spillman, Jr. et al. | |
| 7,380,475 B2 * | 6/2008 | Selig et al. | ............... 73/862.621 |
| 2005/0253051 A1 | 11/2005 | Hwang et al. | |

FOREIGN PATENT DOCUMENTS

DE    3804389 A1    8/1989

OTHER PUBLICATIONS

German Search Report, Application No. 10 2008 054 028.5-52, dated Aug. 27, 2009.

* cited by examiner

*Primary Examiner* — John H Le
(74) *Attorney, Agent, or Firm* — Brooks Kushman P.C.

(57) ABSTRACT

A method and a device for contactless determination of forces and/or moments acting on a hollow cylindrical body (12), in which via a light source (20; 38; 40), light radiation is produced within the hollow cylindrical body (12); measurement signals are recorded by an optoelectronic sensor (22; 34); the measurement signals recorded by the optoelectronic sensor (22; 34) are supplied to the signal processing unit (26); the signal processing unit (26) detects and outputs changes of the measurement signals relative to an initial state determined beforehand by calibration, corresponding to the initial undeformed state of the hollow cylindrical body (12); and when a mechanical deformation of the hollow cylindrical body (12) is present, according to a calibration function or a calculation rule, the signal processing unit (26) outputs an output signal that describes the forces and/or moments that are causing the mechanical deformation of the hollow cylindrical body (12).

19 Claims, 6 Drawing Sheets

PROCESS FOR CONTACT-FREE DETERMINATION OF FORCES AND/OR TORQUE ACTING ON A HOLLOW-CYLINDRICAL BODY AS WELL AS A MEASUREMENT ARRANGEMENT FOR IMPLEMENTING THE PROCESS

CROSS REFERENCE TO RELATED APPLICATIONS:

This application claims priority to German application no. DE 10 2008 054 028.5 filed Oct. 30, 2008 the disclosure of which is incorporated in its entirety by reference herein.

BACKGROUND OF THE INVENTION (1) Field of the Invention

The invention relates to a method for contactless determination of forces and/or moments acting on a hollow cylindrical body and a measurement arrangement for implementing a related method.

(2) Description of Related Art

Although the method according to the invention and the measurement arrangement according to the invention can fundamentally be used for a plurality of different applications, their use as a strut moment measurement system (MMS), i.e., as a system for determining the bending moments acting on the main rotor strut of a helicopter, is presented in detail below.

In an unarticulated construction of the helicopter rotor head in conjunction with partially elastic rotor blades of fiber composite material, high bending moments are delivered into the rotor strut due to the greater virtual joint distance. Overly high bending moments can lead to premature fatigue of the rotor strut or damage of transmission parts. Therefore, the strut moment in flight operation is monitored with a strut moment system (MMS). The moment or a portion of the maximum allowable moment is displayed to the pilot in the cockpit. Exceeding fixed boundary values in operation leads to maintenance operations and should be avoided.

The prior art is currently to measure the strut moment using foil strain gauges (DMS) that are cemented in the upper part of the rotor strut by means of a cement connection.

In operation, the DMS and the cement connection are exposed to dynamic loads and fluctuating ambient conditions (temperature, vibrations, and moisture) and thus are highly stressed. In a defect of the DMS, due to the poor accessibility of the DMS within the rotor strut and due to the complex cementing process, repair is very time-consuming and costly.

BRIEF SUMMARY OF THE INVENTION

The object of the invention is to make available a method and a device for contactless determination of forces/moments acting on a hollow cylindrical body, which has low fault susceptibility relative to ambient conditions.

The object is achieved according to the disclosed method using certain features of the measurement arrangement.

According to the method according to the invention, the forces and/or moments acting on a hollow cylindrical body are determined without contact. For this purpose, light radiation is produced within the hollow cylindrical body by means of a light source, and measurement signals are recorded by means of an optoelectronic sensor. The measurement signals recorded by the optoelectronic sensor are supplied to the signal processing unit. The signal processing unit detects and outputs changes of the measurement signals relative to an initial state determined beforehand by calibration, corresponding to the initial undeformed state of the hollow cylindrical body. When a mechanical deformation of the hollow cylindrical body is present, the signal processing unit outputs an output signal according to a calibration function or a calculation rule, and said output signal describes the forces and/or moments that are causing the mechanical deformation of the hollow cylindrical body.

As a result of using light as the measure for contactless determination, advantageously the method according to the invention is independent of ambient conditions such as, e.g., temperature, vibrations, moisture, or the like.

In one especially preferred embodiment, the hollow cylindrical body is a turning component. I.e., the method is used to determine the forces and/or moments acting on the turning hollow cylindrical body.

Preferably, the relationship between the deformation of the hollow cylindrical body and the forces and/or moments causing the deformation is determined by means of an experimentally determined calibration function or by means of an analytical or numerical calculation rule.

Preferably, within the framework of the method according to the invention, the measurement signals are measured by means of the signal processing unit with digital image processing.

The measurement arrangement according to the invention for implementing the method comprises an optoelectronic detector, a light source, a signal processing unit, an energy source, and means for signal and/or voltage supply between the energy source, the signal processing unit, the light source, and the optoelectronic detector.

According to a first embodiment of the measurement arrangement according to the invention, the optoelectronic detector is designed as a photodetector, and the light source is designed as a laser module with an integrated laser diode. In this case, the photodetector and the laser module are each located within the hollow cylindrical body; specifically, the photodetector is located on the first upper end and the laser module is located on the opposite bottom end of the hollow cylindrical body. In this case, a light beam emitted from the laser module is aligned directly to the photodetector. The measurement arrangement designed as a laser system is characterized especially by high precision (μm) and measurement speed (kHz). Mechanically, the aforementioned measurement arrangement is advantageous since due to the integration of all components within the hollow cylindrical body, bilateral sealing of the hollow cylindrical body is enabled.

Preferably, in this case, the photodetector and also the laser module are located on the corresponding cover that closes the upper and lower end of the hollow cylindrical body. This has the effect that in the case of maintenance, the photodetector and the laser module are easily accessible.

Corresponding to the first embodiment and according to a second embodiment of the measurement arrangement according to the invention, the optoelectronic detector is in turn designed as a photodetector and the light source is in turn designed as a laser module with an integrated laser diode. In contrast to the first embodiment, in this connection both the photodetector and also the laser module are located outside of the hollow cylindrical body, while there is simply a mirror within the hollow cylindrical body, specifically on the first, upper end. In this connection, the photodetector, the laser module and the minor are arranged relative to one another such that a light beam emitted by the laser module is incident on the photodetector after reflection on the minor. The advantage of this embodiment is especially that as a result of the arrangement of the components laser module and photodetector outside of the turning hollow cylindrical body, it is no longer necessary to transmit signals from the turning body. Moreover, simplified accessibility of the components from one side is enabled.

Preferably, in this case, in the region of the laser module, there is another semitransparent reflector via which a light beam emitted from the laser module can be deflected onto the minor. In this way, a horizontal arrangement of the laser module that saves installation space is advantageously enabled.

According to one especially advantageous embodiment of the measurement arrangement, on one end of the hollow cylindrical body there is a pattern/grid and the optoelectronic detector is designed as a camera with a CCD or CMOS sensor. The light source is located inside or outside, and the camera is located outside of the hollow cylindrical body. This embodiment is especially advantageous since the requirements for positioning and alignment of the camera and the light source are much less rigid than in laser systems.

According to one embodiment, in this case the light source is located within the hollow cylindrical body and forms a unit with the pattern/grid.

In one especially advantageous embodiment, the pattern/grid is designed to be self-illuminating, for example from tritium. This embodiment is especially low-maintenance, and an active light source is not required.

According to a further embodiment of the measurement arrangement according to the invention, the signal processing unit has a digital image processing unit.

Preferably, the measurement arrangement according to the invention is used to determine the strut moment of the main rotor strut of a rotary wing aircraft.

According to one embodiment of the measurement arrangement according to the invention, the optoelectronic detector is designed as a photodetector, and the light source is designed as a laser module with an integrated laser diode, whereby the photodetector and the laser module are located on a first end of the hollow cylindrical body, on a cover that closes the hollow cylindrical body, whereby the photodetector and the laser module are located within the hollow cylindrical body, whereby a collimator is located on the opposite end, within the hollow cylindrical body, and whereby the collimator is connected to the laser module by means of a glass fiber.

Preferably, the collimator is held in a sleeve within the hollow cylindrical body for alignment of the collimator.

BRIEF DESCRIPTION OF THE SEVERAL VIEWS OF THE DRAWINGS

Other advantages, features and possible applications of the invention will become apparent from the following specification in conjunction with the embodiments shown in the drawings.

In the specification, in the claims, in the abstract and in the drawings, the terms and assigned reference numbers used in the list of reference numbers cited below are used. In the drawings:

DETAILED DESCRIPTION OF THE INVENTION

To avoid repetition, in the following description and in the Figures, the same components are also identified with the same reference numbers if no further differentiation is necessary or useful.

Figure 1:
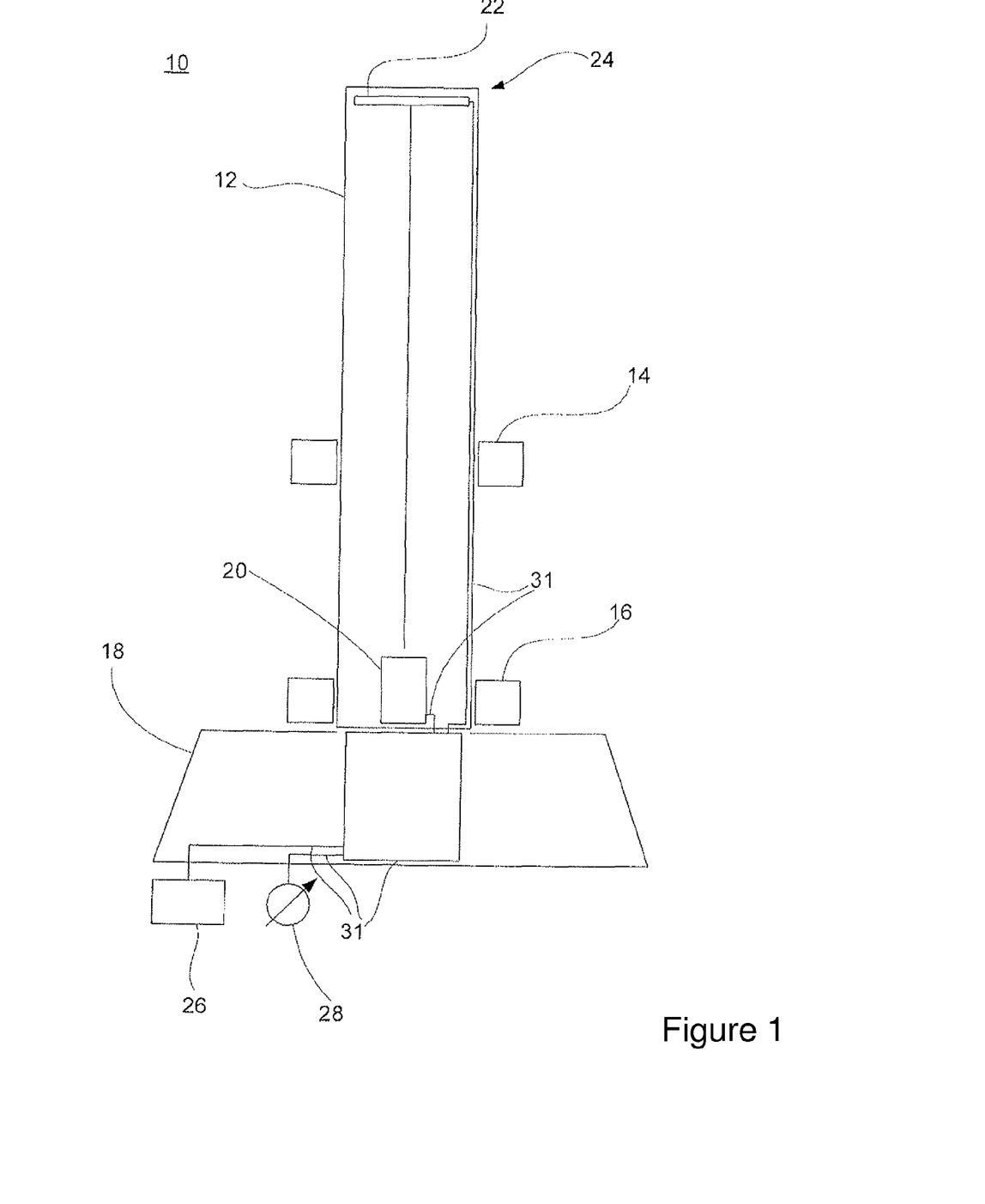
FIG. 1 shows a schematic of the main rotor strut of a helicopter with a measurement arrangement according to the invention for determining the bending moment according to a first embodiment.

FIG. 1 shows more or less schematically a main rotor strut labeled altogether with reference number 10 in the transmission of a helicopter. The main rotor strut 10 comprises essentially a rotor strut 12 that is designed as a hollow body and that can be mounted to rotate by way of an upper strut bearing 14 and a lower strut bearing 16. For reasons of clarity, an explicit description of the transmission has been omitted here. Instead, the installation space or clearance within the transmission is schematically labeled with reference number 18.

Located within the rotor strut 12 are a light source in the form of a laser module 20 that has an integrated laser diode and an optoelectronic sensor in the form of a photodetector 22. The photodetector 22 is located on the first end 24 of the rotor strut 12, and the laser module 20 is located in the region of the opposite end of the rotor strut 12 facing the installation space or clearance 18. In this case, the laser module 20 is located in the rotor strut 12 such that a light beam emitted by the laser module 20 is aligned running parallel to the axis of rotation of the rotor strut 12 to the photodetector 22.

Other components outside of the rotor strut 12 are a signal processing unit 26 and an energy source 28. Signal or voltage supply between the laser module 20, the photodetector 22, the signal processing unit 26, and the energy source 28 is ensured by way of the correspondingly arranged means for signal and/or voltage supply 31.

The photodetector 22 on the first end 24 of the rotor strut 12 records the location of light beam incidence. In deformation of the rotor strut 12 due to, for example, a bending moment acting on the first end 24 of the rotor strut 12, the photodetector 22 migrates relative to the light beam and thus the light spot on the surface of the photodetector 22. The acting bending moment is derived from the output signals of the photodetector 22 by means of the signal processing unit 26 and by means of a calibration function or an analytical or numerical process.

Fundamentally, the aforementioned measurement arrangement also allows determination of the direction of displacement. The elements that are still necessary for this purpose, such as, e.g., a magnetic clock generator for synchronization, have been omitted here for reasons of clarity.

Figure 2:
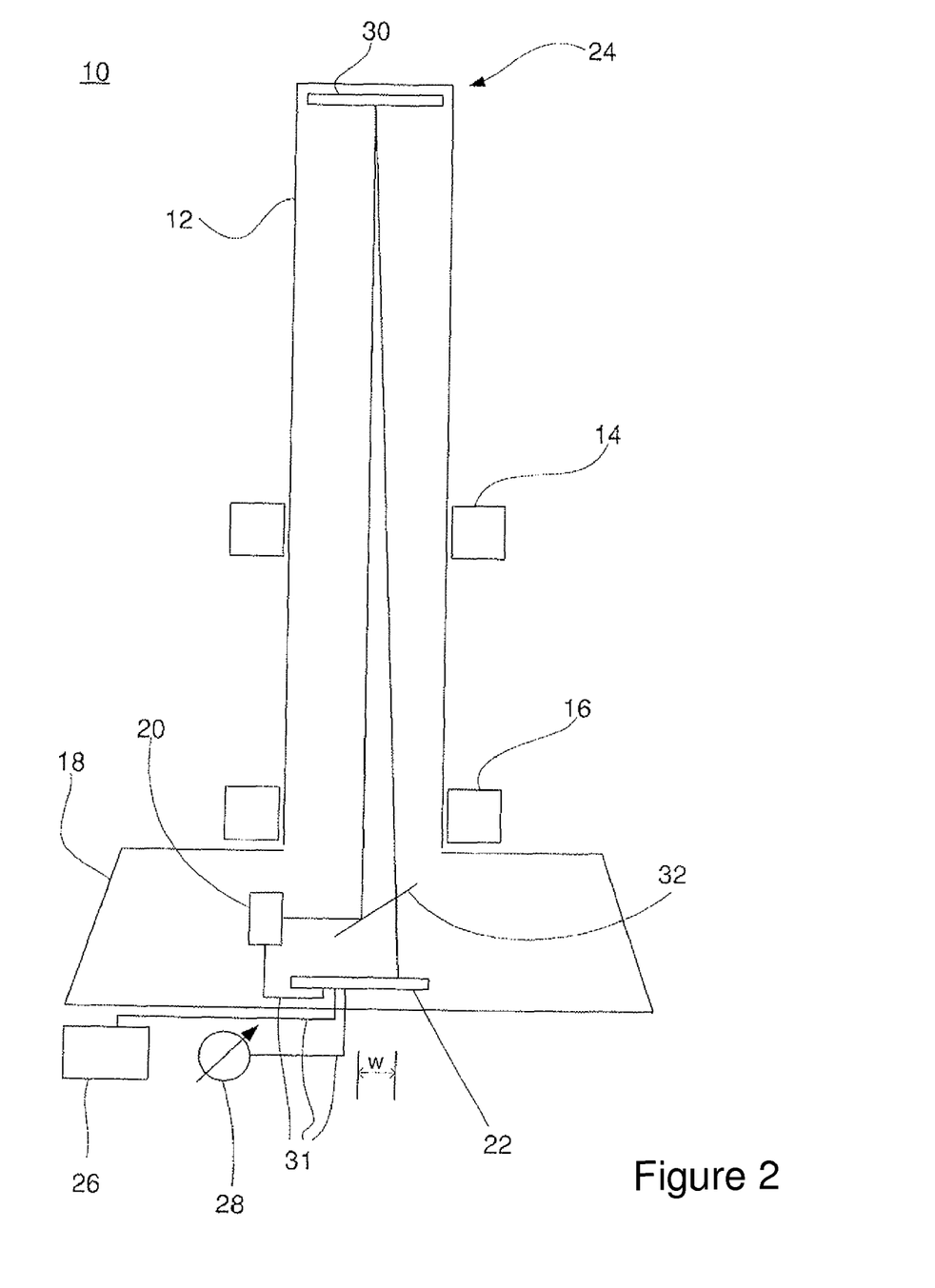
FIG. 2 shows the main rotor strut from FIG. 1 with a second embodiment of the measurement arrangement according to the invention.

In the embodiment shown in FIG. 2, the laser module 20 and the photodetector 22 are located outside of the rotor strut 12, specifically in the installation space or clearance 18 within the transmission. Within the rotor strut 12, a minor 30 is located only on the first end 24 of the rotor strut 12. Moreover, in the region of the laser module 20, there is another reflector in the form of a semitransparent minor 32.

The light beam emitted by the laser module 20 is deflected by way of the semitransparent mirror 32 onto the mirror 30 that is located in the rotor strut 12. The light beam reflected from the mirror 30 after passing through the semitransparent mirror 32 is incident on the surface of the photodetector 22.

The distance w to the photodetector 22 is dependent on the bending angle. Based on this, other quantities, such as displacement, forces, moments, etc., can then be derived using the signal processing unit and the calibration function or the numerical or analytical process used.

Based on the arrangement of the laser module 20 and the photodetector 22 outside of the rotating rotor strut 12, signal transmission between the rotating and nonrotating components can be advantageously abandoned. Moreover, simplified accessibility of the components laser module 20 and photodetector 22 from one side of the rotor strut 12 and simplified cable routing are advantageous.

Figure 3:
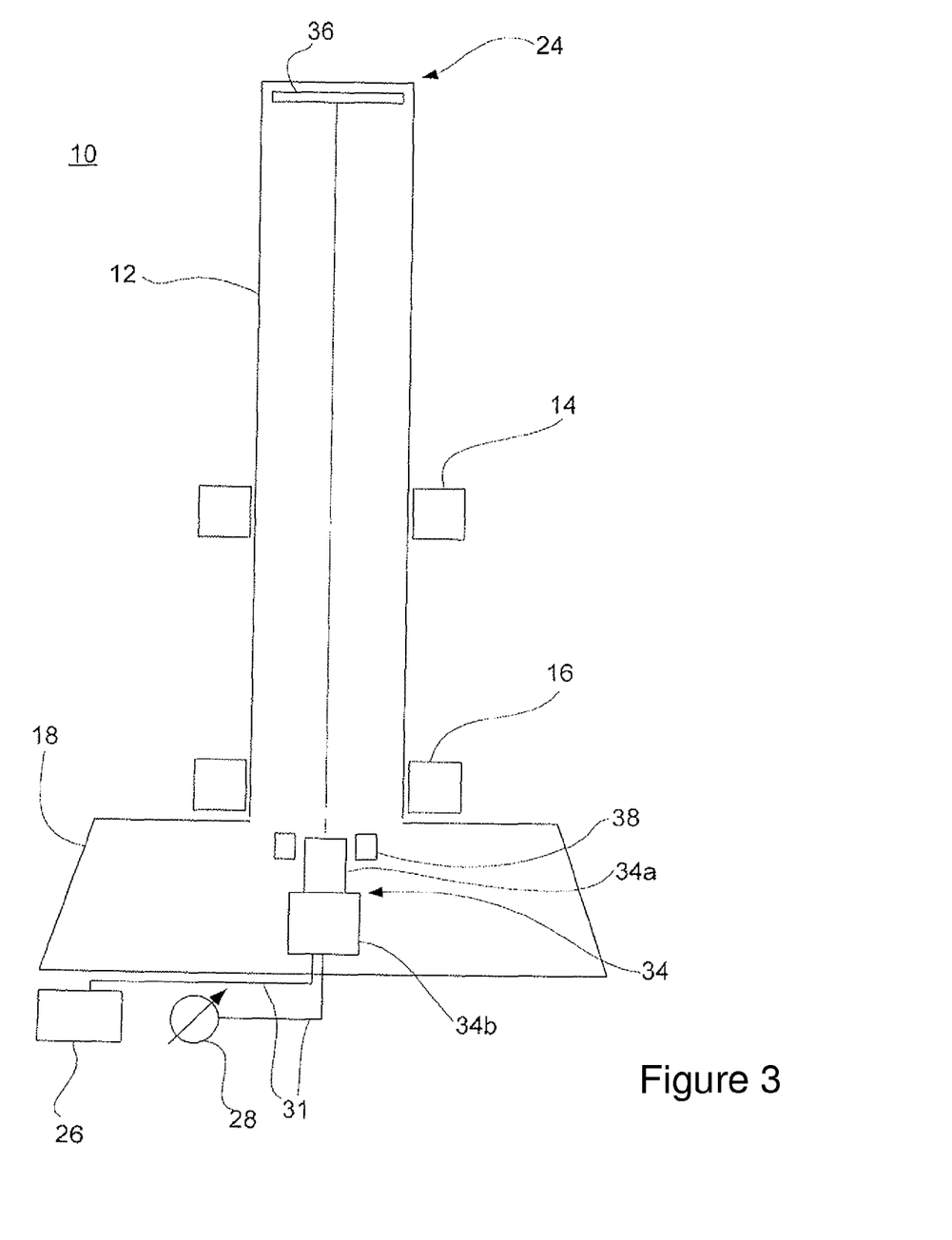
FIG. 3 shows the main rotor strut from FIG. 1 with a third embodiment of the measurement arrangement according to the invention.

In the embodiment shown in FIG. 3, the optoelectronic detector is designed in the form of a camera 34 with a CCD or CMOS sensor, and a pattern/grid 36 is located within the rotor strut 12 on the first end 24 of the rotor strut 12. In the conventional manner, the camera 34 has a camera objective lens 34*a* and a camera housing 34*b* that holds the CCD or CMOS sensor.

To illuminate the pattern/grid 36, there is a light source, for example in the form of an LED ring light fixture 38. The camera 34 and LED light fixtures 38 are each located in the installation space or clearance 18.

The pattern/grid 36 is photographed by the camera 34 at regular intervals. The signal processing unit 26, which according to this embodiment comprises especially also a digital image processing unit, evaluates the images and, based on a comparison of the image sequences, determines the movement of the pattern/grid 36 and thus the deformation of the rotor strut 12.

In turn, by means of the analytical or numerical process, the forces and moments that are acting on the rotor strut 12 and that cause deformation are computed from the deformation.

The simple mechanical structure is especially advantageous in this embodiment. All components are located underneath the rotor strut 12 and are thus easily accessible for maintenance.

Figure 4:
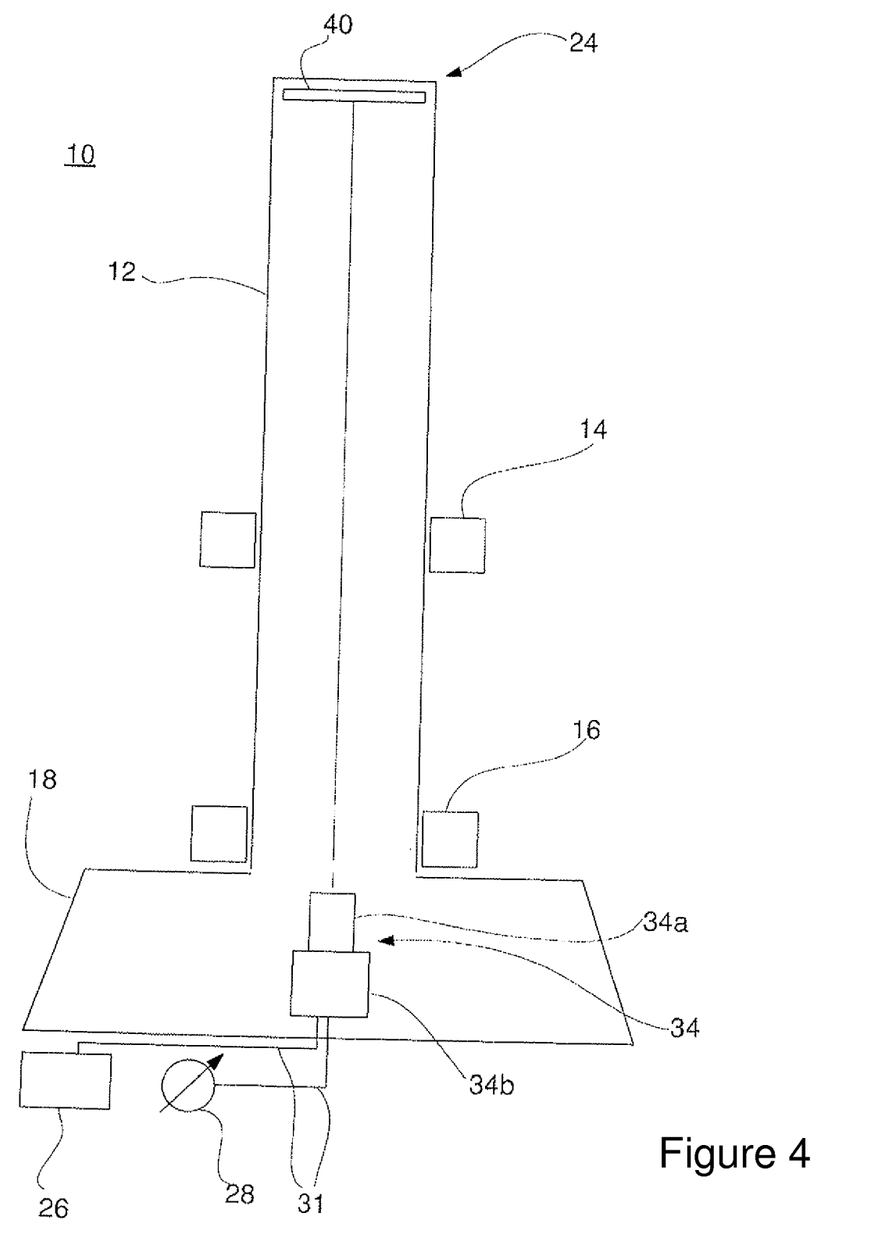
FIG. 4 shows a variation of the measurement arrangement from FIG. 3.

In the embodiment shown in FIG. 4, in contrast to the embodiment shown in FIG. 3, a separate light source 38 is not necessary since the pattern/grid 40 is designed to be self-illuminating, from tritium.

Figure 5:
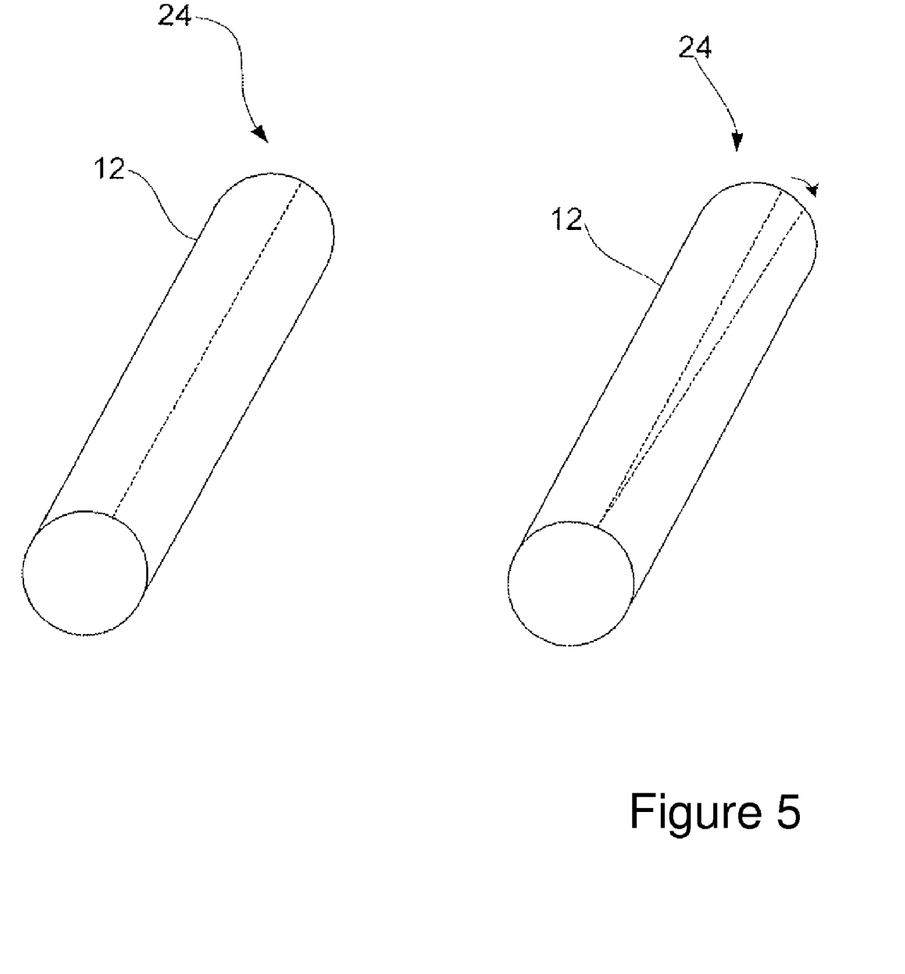
FIG. 5 shows a schematic of the rotor strut from FIG. 3 or 4 for explanation of the determination of the torsional moment.

As shown schematically in FIG. 5, the camera-based embodiments, cf. FIG. 3 and FIG. 4, also allow determination of the twisting, from which the torsional moment can be analytically determined.

If the rotor strut 12 is exposed to a torsional moment, the first end 24 twists relative to the opposite end. If at this point the image sequences of the camera 34 are synchronized such that the end of the rotor strut 12 opposite the first end 24 in each image is always located at the same position (i.e., at the same phase angle), for example when the image frequency is equal to the rotational frequency, the twist can be derived using the location of the grid/pattern 36 or 40 on the end 24.

Figure 6:
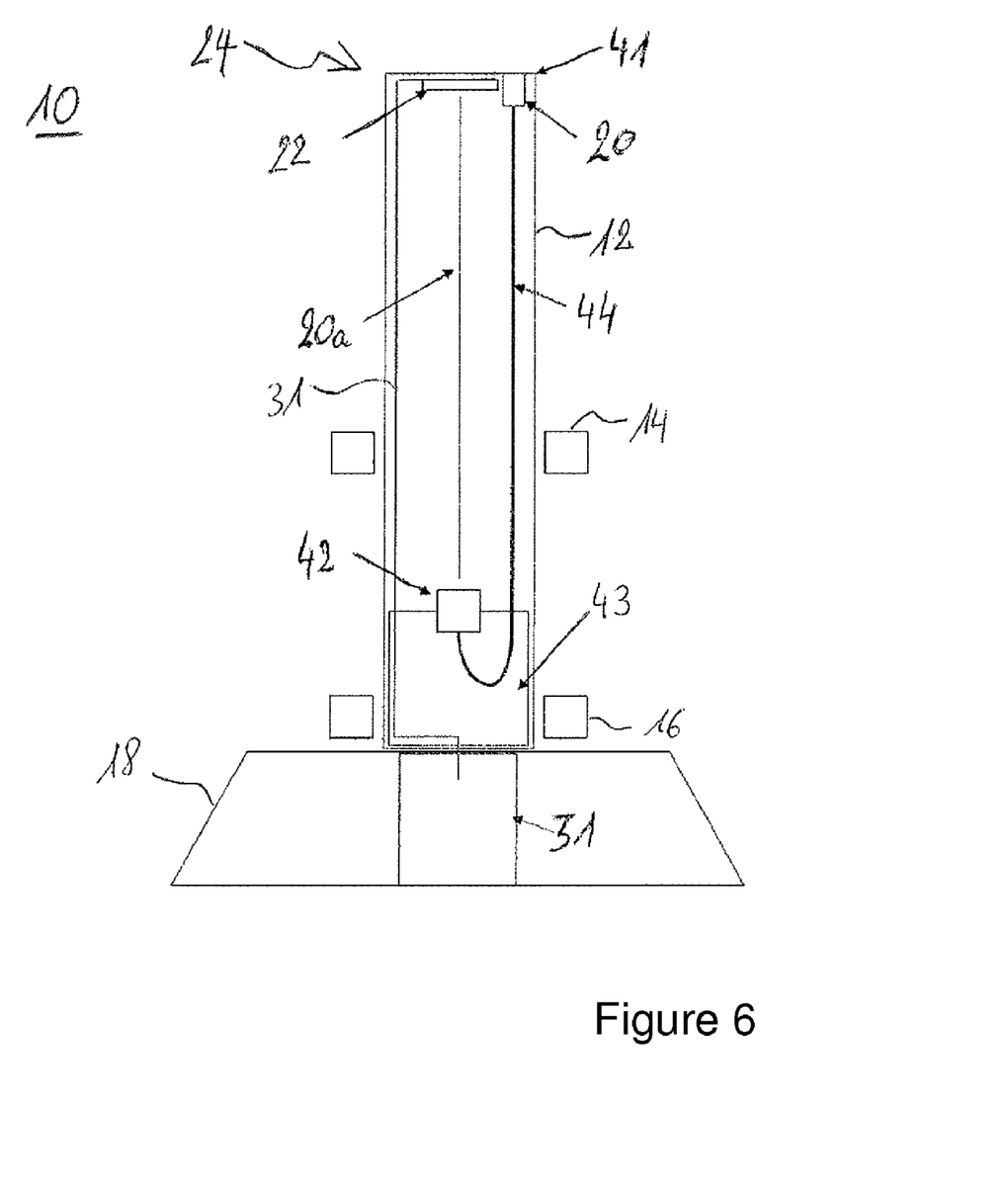
FIG. 6 shows the main rotor strut from FIG. 1 with another embodiment of the measurement arrangement according to the invention.

In the embodiment shown in FIG. 6, the optoelectronic detector is designed as a photodetector 22, and the light source is designed as a laser module 20 with an integrated laser diode. The photodetector 22 and the laser module 20 are located on the first end 24 of the hollow cylindrical body 12 on a cover 41 that closes the hollow cylindrical body 12. The photodetector 22 and the laser module 20 are located within the hollow cylindrical body 12.

A collimator 42 is located on the opposite end, within the hollow cylindrical body 12, and is connected to the laser module 20 by means of a glass fiber 44. The collimator 42 is used to focus the laser beam 20*a*.

The collimator 42 is held preferably in a sleeve 43 within the hollow cylindrical body 12 for alignment of the collimator 42. Signal transmission and power supply take place as in the embodiment from FIG. 1.

For example, signal processing can be implemented as in the embodiment from FIG. 1.

In the embodiment from FIG. 6, all active components are thus attached to the first shaft end (first upper end of the body 12) and therefore by way of the cover 41' can be easily accessibly removed if necessary with the cover. Moreover, displacement of the active components away from the hot lower shaft end (lower end of the body 12) toward the cooler upper and first shaft end is produced, for example in applications within transmissions with high temperatures.

According to the invention, the hollow cylindrical body 12, for example a shaft, or a strut, can be sealed on both ends with covers against ambient effects.

REFERENCE NUMBER LIST

10 Main rotor strut
12 Semicylindrical body/rotor strut
14 Upper strut bearing
16 Lower strut bearing
18 Clearance/installation space in the transmission
20 Laser module with integrated laser diode
20*a* Laser beam
22 Photodetector
24 First end of the hollow cylindrical body
26 Signal processing unit
28 Energy source
30 Mirror
31 Means for signal and/or voltage supply
32 Reflector
34 Camera
34*a* Objective lens of the camera
34*b* Camera housing
36 Pattern/grid
38 LED
40 Self-illuminating pattern/grid
41 Cover
42 Collimator
43 Sleeve
44 Glass fiber
w Distance to photodetector

The invention claimed is:

1. Method for contactless determination of forces and/or moments acting on a hollow cylindrical body (12), comprising by means of a light source (20; 38; 40), light radiation is produced within the hollow cylindrical body (12);

measurement signals of the light radiation are recorded by means of an optoelectronic sensor (22; 34);

the measurement signals recorded by the optoelectronic sensor (22; 34) are supplied to a signal processing unit (26);

the signal processing unit (26) detects and outputs changes of the measurement signals relative to an initial state determined beforehand by calibration, corresponding to an initial undeformed state of the hollow cylindrical body (12);

when a mechanical deformation of the hollow cylindrical body (12) is present, according to a calibration function or a calculation rule, the signal processing unit (26) outputs an output signal that describes the forces and/or moments that are causing the mechanical deformation of the hollow cylindrical body (12).

2. Method according to claim 1, characterized in that determination of the forces and/or moments is done on a turning hollow cylindrical body (12).

3. Method according to claim 2, wherein the relationship between the deformation of the hollow cylindrical body (12) and the forces and/or moments causing the deformation is determined by means of an experimentally determined calibration function or by means of an analytical or numerical calculation rule.

4. Method according to claim 1, wherein the relationship between the deformation of the hollow cylindrical body (12) and the forces and/or moments causing the deformation is determined by means of an experimentally determined calibration function or by means of an analytical or numerical calculation rule.

5. Method according to claim 1, wherein the measurement signals are measured by means of the signal processing unit (26) with digital image processing.

6. Measurement arrangement for implementing the method according to claim 1, comprising
the optoelectronic sensor (22; 34);
the light source (20; 38; 40);
the signal processing unit (26);
an energy source (28); and
means for signal and/or voltage supply (31) between the energy source (28), the signal processing unit (26), the light source (20; 38; 40) and the optoelectronic sensor (22; 34).

7. Measurement arrangement according to claim 6, wherein the signal processing unit (26) has a digital image processing unit.

8. Measurement arrangement according to claim 7, wherein the optoelectronic sensor is designed as a photodetector (22), and the light source is designed as a laser module (20) with an integrated laser diode, whereby the photodetector (22) is located on a first end (24) of the hollow cylindrical body (12) and the laser module (20) is located on an opposite end, each within the hollow cylindrical body (12), and a light beam emitted from the laser module is aligned directly to the photodetector (22).

9. Measurement arrangement according to claim 6, wherein the optoelectronic sensor is designed as a photodetector (22), and the light source is designed as a laser module (20) with an integrated laser diode, whereby the photodetector (22) is located on a first end (24) of the hollow cylindrical body (12) and the laser module (20) is located on an opposite end, each within the hollow cylindrical body (12), and a light beam emitted from the laser module is aligned directly to the photodetector (22).

10. Measurement arrangement according to claim 9, wherein the photodetector (22) and the laser module (20) are each located on a cover that closes the hollow cylindrical body (12).

11. Measurement arrangement according to claim 6, wherein the optoelectronic sensor is designed as a photodetector (22) and the light source is designed as a laser module (20) and they are each located outside of the hollow cylindrical body (12), and wherein there is a mirror (30) on the inside on the first end (24) of the hollow cylindrical body, whereby the photodetector (22), the laser module (20) and the mirror (30) are arranged relative to one another such that a light beam emitted by the laser module (20) is incident on the photodetector (22) only after reflection on the mirror (30).

12. Measurement arrangement according to claim 11, wherein in a region of the laser module (20), there is another reflector (32) via which a light beam emitted from the laser module (20) can be deflected onto the mirror (30).

13. Measurement arrangement according to claim 6, wherein on one end (24) within the hollow cylindrical body (12), there is a pattern/grid (36) and the optoelectronic sensor is designed as a camera (34) with a CCD or CMOS sensor, whereby the light source (38) is located inside or outside and the camera (34) is located outside of the hollow cylindrical body (12).

14. Measurement arrangement according to claim 13, wherein the light source (40) is located within the hollow cylindrical body (12) and the light source and the pattern/grid form a unit.

15. Measurement arrangement according to claim 14, wherein the pattern/grid is made from a self-illuminating material.

16. Measurement arrangement according to claim 15, wherein the pattern/grid is made from tritium.

17. Measurement arrangement according to claim 6, wherein the optoelectronic sensor is designed as a photodetector (22) and the light source is designed as a laser module (20) with an integrated laser diode, whereby the photodetector (22) and the laser module (20) are located on a first end (24) of the hollow cylindrical body (12), on a cover (41) that closes the hollow cylindrical body (12), whereby the photodetector (22) and the laser module (20) are located within the hollow cylindrical body (12), and wherein a collimator (42) is located on an opposite end, within the hollow cylindrical body (12), whereby the collimator (42) is connected to the laser module (20) by means of a glass fiber (44).

18. Measurement arrangement according to claim 17, wherein a collimator (42) is held in a sleeve (43) within the hollow cylindrical body (12) for alignment of the collimator (42).

19. Rotary wing aircraft, wherein the measurement arrangement according to claim 6 is used for determining a strut moment of a main rotor strut.

* * * * *